United States Patent
Kamiya

(10) Patent No.: US 11,939,892 B2
(45) Date of Patent: Mar. 26, 2024

(54) VALVE TIMING ADJUSTMENT DEVICE

(71) Applicant: DENSO CORPORATION, Kariya (JP)

(72) Inventor: Takahito Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 481 days.

(21) Appl. No.: 17/194,801

(22) Filed: Mar. 8, 2021

(65) Prior Publication Data

US 2021/0189923 A1 Jun. 24, 2021

Related U.S. Application Data

(63) Continuation of application No. PCT/JP2019/034215, filed on Aug. 30, 2019.

(30) Foreign Application Priority Data

Sep. 10, 2018 (JP) .................. 2018-168606

(51) Int. Cl.
*F01M 1/10* (2006.01)
*F01L 1/344* (2006.01)
*F01L 1/352* (2006.01)
*F01M 1/06* (2006.01)

(52) U.S. Cl.
CPC ............... *F01M 1/10* (2013.01); *F01L 1/344* (2013.01); *F01L 1/352* (2013.01); *F01M 1/06* (2013.01); *F01L 2810/02* (2013.01); *F01M 2001/064* (2013.01); *F01M 2001/105* (2013.01)

(58) Field of Classification Search
CPC ... F01L 1/344; F01L 1/352; F01L 2001/3444; F01L 2250/02; F01L 2301/00; F01L 2810/02; F01M 1/06; F01M 1/10; F01M 2001/064; F01M 2001/105; F16H 57/04
See application file for complete search history.

(56) References Cited

U.S. PATENT DOCUMENTS

| | | | |
|---|---|---|---|
| 9,982,577 B2 | 5/2018 | Kohrs et al. | |
| 2007/0266977 A1* | 11/2007 | Takenaka | F01L 1/352 123/90.17 |

(Continued)

FOREIGN PATENT DOCUMENTS

| | | |
|---|---|---|
| JP | 60-012756 | 1/1985 |
| JP | 2011-111971 | 6/2011 |

*Primary Examiner* — John Kwon
*Assistant Examiner* — Johnny H Hoang
(74) *Attorney, Agent, or Firm* — Nixon & Vanderhye P.C.

(57) ABSTRACT

A valve timing adjustment device includes: a driving rotating body that rotates with a crankshaft; a driven rotating body that rotates with a camshaft; a reduction mechanism configured to change a relative rotation phase of the driving rotating body and the driven rotating body by a driving force of an actuator; and a filter unit capable of capturing a foreign matter contained in lubricating fluid supplied into the reduction mechanism. The reduction mechanism includes: an internal gear portion having internal teeth formed inward in a radial direction, and an external gear portion having external teeth formed outward in the radial direction to mesh with the internal teeth. The driven rotating body has a supply hole penetrating in an axial direction. The filter unit has holes penetrating in the axial direction, and the holes are arranged in a flow path of the lubricating fluid connected to the supply hole.

8 Claims, 10 Drawing Sheets

(56) References Cited

U.S. PATENT DOCUMENTS

| | | | |
|---|---|---|---|
| 2009/0133650 A1* | 5/2009 | Mizutani | F01L 1/022 123/90.17 |
| 2013/0213756 A1* | 8/2013 | Nara | F01L 1/352 192/21.5 |
| 2016/0010516 A1 | 1/2016 | Suzuki et al. | |
| 2017/0101905 A1 | 4/2017 | Kohrs et al. | |
| 2019/0120091 A1* | 4/2019 | Tada | F01L 1/356 |
| 2020/0248593 A1* | 8/2020 | Kinouchi | F01L 1/344 |
| 2020/0318720 A1* | 10/2020 | Ikeguchi | F16H 55/08 |

* cited by examiner

VALVE TIMING ADJUSTMENT DEVICE

CROSS REFERENCE TO RELATED APPLICATION

The present application is a continuation application of International Patent Application No. PCT/JP2019/034215 filed on Aug. 30, 2019, which designated the U.S. and claims the benefit of priority from Japanese Patent Application No. 2018-168606 filed on Sep. 10, 2018. The entire disclosures of all of the above applications are incorporated herein by reference.

TECHNICAL FIELD

The present disclosure relates to a valve timing adjustment device.

BACKGROUND

A valve timing adjustment device adjusts valve timing of an intake valve or an exhaust valve of an internal combustion engine. Lubricating oil may be supplied into a reduction mechanism of the valve timing adjustment device.

SUMMARY

A valve timing adjustment device is configured to adjust valve timing of a valve that is driven to open or close by a camshaft to which an engine torque is transmitted from a crankshaft in an internal combustion engine. The valve timing adjustment device includes: a driving rotating body that rotates in conjunction with the crankshaft; a driven rotating body that rotates in conjunction with the camshaft; a reduction mechanism configured to change a relative rotation phase of the driving rotating body and the driven rotating body by a driving force of an actuator; and a filter unit capable of capturing a foreign matter contained in lubricating fluid supplied into the reduction mechanism. The reduction mechanism includes an internal gear portion having internal teeth formed inward in a radial direction, and an external gear portion having external teeth formed outward in the radial direction to mesh with the internal teeth. The driven rotating body has a supply hole penetrating in an axial direction to supply the lubricating fluid into the reduction mechanism through the camshaft. The filter unit has a plurality of holes penetrating in the axial direction, and the plurality of holes are arranged in a flow path connected to the supply hole for the lubricating fluid.

DETAILED DESCRIPTION

Figure 1:
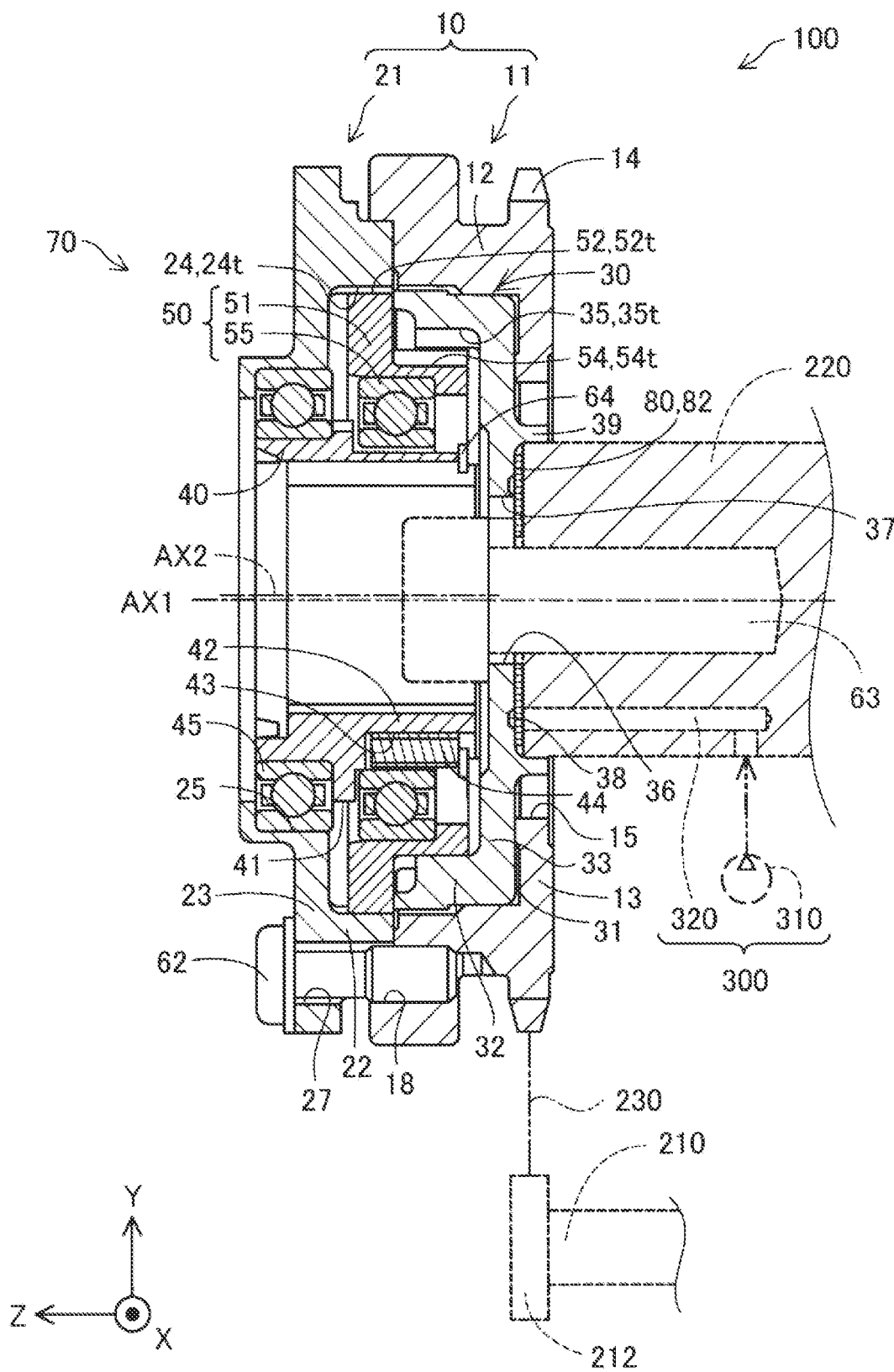
FIG. 1 is a cross-sectional view illustrating a schematic configuration of a valve timing adjustment device according to a first embodiment.

To begin with, examples of relevant techniques will be described.

Conventionally, a valve timing adjustment device capable of adjusting valve timing of an intake valve or an exhaust valve of an internal combustion engine has been known. Lubricating oil may be supplied into a reduction mechanism of the valve timing adjustment device. The reduction mechanism of the valve timing adjustment device includes a wave gear mechanism. The lubricating oil is supplied through a labyrinth flow path recessed in the axial direction at the end surface of the camshaft adapter. A pocket is formed in the flow path outward in the radial direction. A foreign matter contained in the lubricating oil is trapped in the pocket by the centrifugal force during driving of the valve timing adjustment device.

In the valve timing adjustment device, relatively small foreign matter contained in the lubricating oil is not caught in the pocket by riding on the flow of the lubricating oil. The relatively small foreign matter may enter the gear meshing portion inside the reduction gear. Moreover, under low temperature or low speed rotation condition, there is a concern that a foreign matter will not be trapped in the pocket since the centrifugal force is small. If a foreign matter enters the gear meshing portion, the gear may be worn or the valve timing adjustment device may be stopped due to the gear lock. In particular, such an issue can occur even with a relatively small foreign substance, in a reduction mechanism having a relatively small gear size such as a wave gear mechanism or a downsized gear mechanism. There is a demand for a technique capable of further suppressing foreign matter contained in the lubricating oil from entering the gear meshing portion inside the reduction mechanism.

The present disclosure provides a valve timing adjustment device in the following forms.

According to an aspect of the present disclosure, a valve timing adjustment device is configured to adjust valve timing of a valve that is driven to open or close by a camshaft to which an engine torque is transmitted from a crankshaft in an internal combustion engine. The valve timing adjustment device includes: a driving rotating body that rotates in conjunction with the crankshaft; a driven rotating body that rotates in conjunction with the camshaft; a reduction mechanism configured to change a relative rotation phase of the driving rotating body and the driven rotating body by a driving force of an actuator; and a filter unit capable of capturing a foreign matter contained in lubricating fluid supplied into the reduction mechanism. The reduction mechanism includes an internal gear portion having internal teeth formed inward in a radial direction, and an external gear portion having external teeth formed outward in the radial direction to mesh with the internal teeth. The driven rotating body has a supply hole penetrating in an axial direction to supply the lubricating fluid into the reduction mechanism through the camshaft. The filter unit has a plurality of holes penetrating in the axial direction, and the plurality of holes are arranged in a flow path connected to the supply hole for the lubricating fluid.

Accordingly, the filter unit capable of capturing foreign matter contained in the lubricating fluid supplied into the reduction mechanism is arranged in the flow path connected to the supply hole, and has the holes penetrating in the axial direction. Therefore, it is possible to restrict a foreign matter contained in the lubricating fluid from entering the gear meshing portion between the internal gear portion and the external gear portion inside the reduction mechanism.

The present disclosure can be realized as the following embodiments. For example, the present disclosure can be realized in a method for manufacturing a valve timing adjustment device, an internal combustion engine provided with a valve timing adjustment device, and a vehicle provided with the internal combustion engine.

First Embodiment

A valve timing adjustment device 100 of a first embodiment shown in FIG. 1 is provided in a power transmission path from a crankshaft 210 to a camshaft 220 of an internal combustion engine (not shown) in a vehicle. The valve timing adjustment device 100 adjusts valve timing of an intake valve as a valve (not shown) which is driven to open and close by the camshaft 220 to which engine torque is transmitted from the crankshaft 210.

Figure 2:
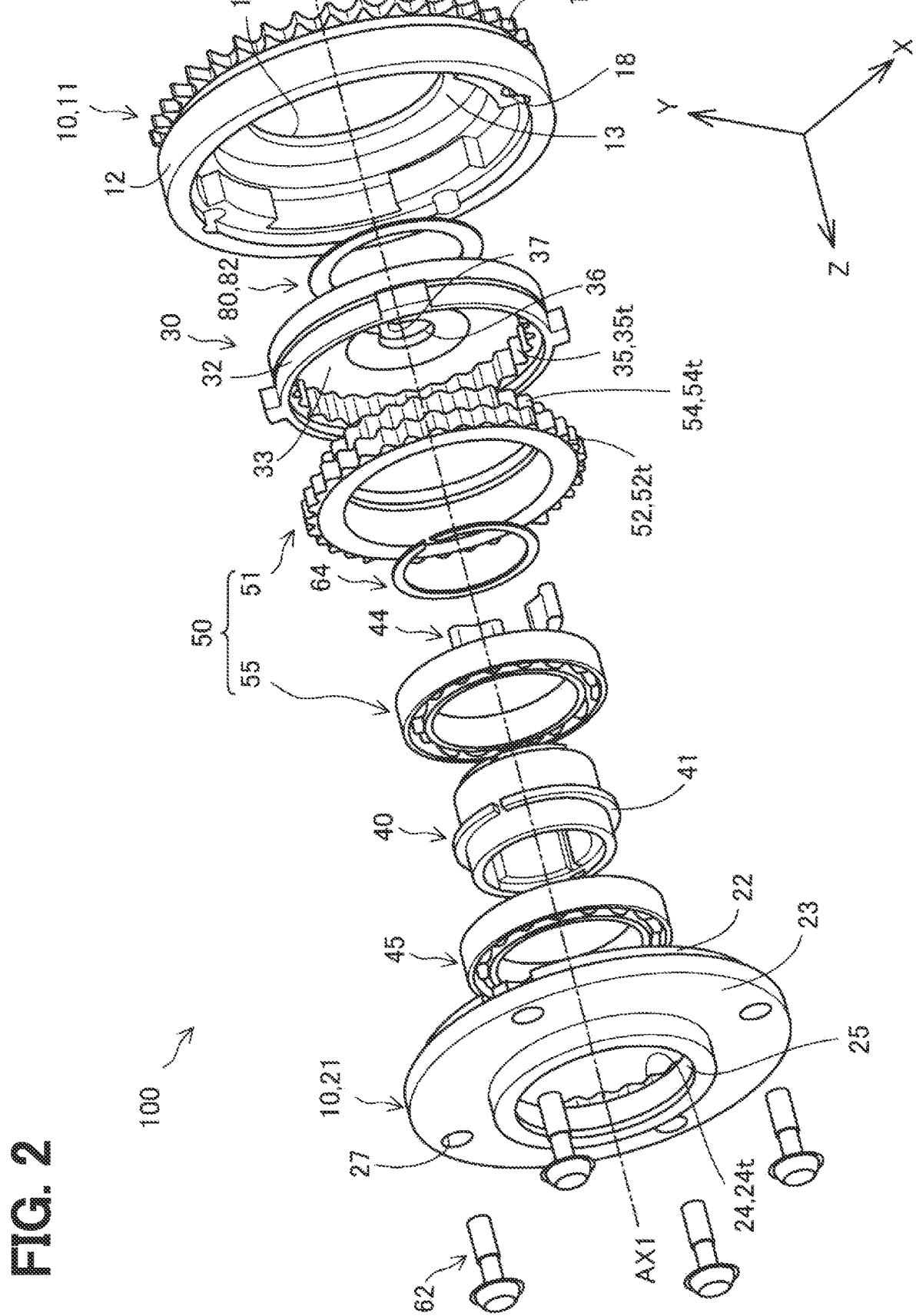
FIG. 2 is an exploded perspective view illustrating the valve timing adjustment device.
Figure 3:
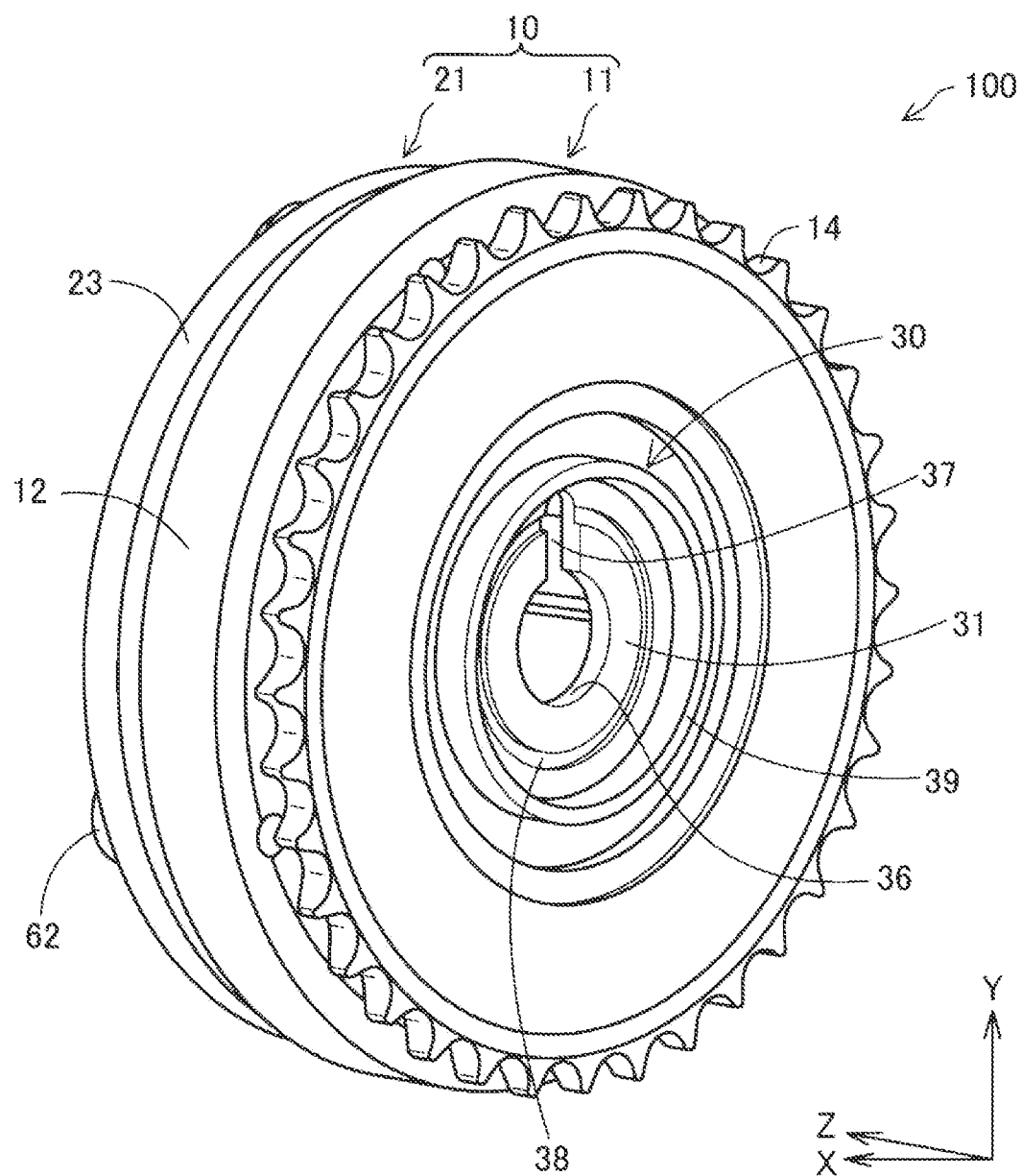
FIG. 3 is a perspective view illustrating the valve timing adjustment device.
Figure 4:
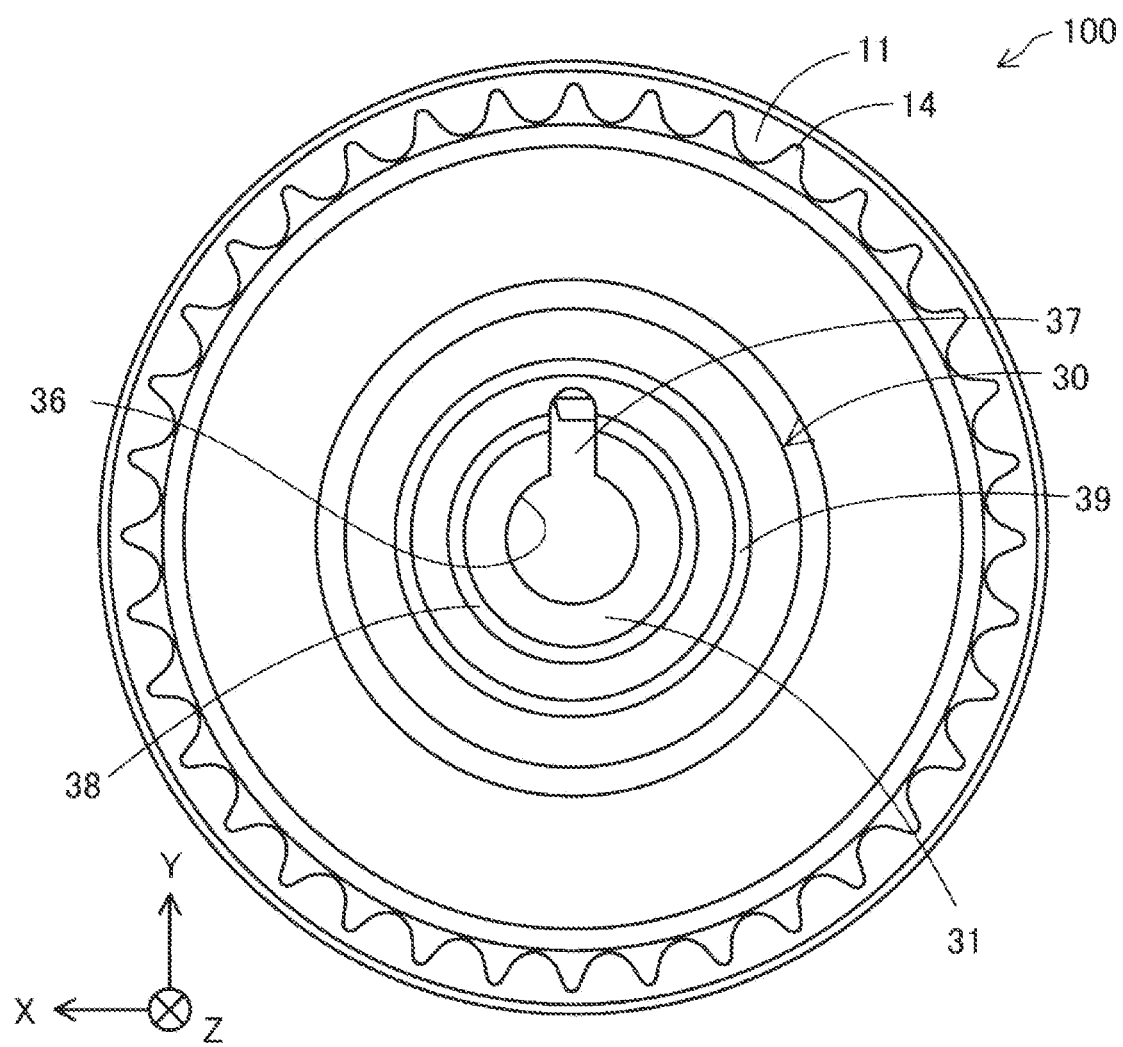
FIG. 4 is a front view illustrating the valve timing adjustment device.

As shown in FIGS. 1 to 4, the valve timing adjustment device 100 includes a driving rotating body 10, a driven rotating body 30, a reduction mechanism 70, and a filter member 80. FIG. 1 shows the crankshaft 210, the camshaft 220, a lubricating oil supply system 300 in addition to the valve timing adjustment device 100. In FIGS. 3 and 4, for convenience of explanation, the filter member 80 is not shown.

The driving rotating body 10 has the same rotation axis AX1 as the rotation axis AX1 of the camshaft 220, and rotates in conjunction with the crankshaft 210. In the following description, a direction parallel to the rotation axis AX1 is also referred to as an axial direction. The driving rotating body 10 has a first housing 11 and a second housing 21.

The first housing 11 has a substantially tubular bottomed shape, and includes a first cylindrical portion 12 and a first bottom portion 13. The first cylindrical portion 12 has a substantially cylindrical shape. A sprocket 14 is formed on the outer peripheral surface of the first cylindrical portion 12. As shown in FIG. 1, a timing chain 230 is hung between the sprocket 14 and a sprocket 212 formed on the crankshaft 210. The engine torque of the crankshaft 210 is transmitted to the sprocket 14 via the timing chain 230, so that the first housing 11 rotates in conjunction with the crankshaft 210.

A physical stopper (not shown) is formed on the inner peripheral surface of the first cylindrical portion 12 to regulate the phase. Plural bolt insertion holes 18 are formed in the first cylindrical portion 12 so as to be arranged in the circumferential direction. The four bolt insertion holes 18 are used for fastening the first cylindrical portion 12 to the second housing 21. A camshaft insertion hole 15 is formed at substantially the center of the first bottom portion 13. The camshaft 220 is inserted into the camshaft insertion hole 15.

The second housing 21 has a substantially tubular bottomed shape, and includes a second cylindrical portion 22 and a second bottom portion 23. A driving-side internal gear portion 24 is formed on the inner peripheral surface of the second cylindrical portion 22. The driving-side internal gear portion 24 functions as a part of the reduction mechanism 70 as described later, and has plural driving-side internal teeth 24t formed to face inward in the radial direction. An opening 25 is formed substantially at the center of the second bottom portion 23. An input rotating body 40, which will be described later, is arranged in the opening 25 via the first bearing 45. Plural bolt insertion holes 27 are formed in the outer edge side of the second bottom portion 23, and are arranged in the circumferential direction. Bolts 62 are respectively inserted into the bolt insertion holes 27 and the bolt insertion holes 18 formed in the first housing 11. The bolt 62 fastens the first housing 11 and the second housing 21.

The driven rotating body 30 is fitted inside the first cylindrical portion 12 of the first housing 11 so as to be rotatable relative to the driving rotating body 10. The driven rotating body 30 has a substantially tubular bottomed shape, and includes a third cylindrical portion 32 and a third bottom portion 33. The third cylindrical portion 32 has a substantially cylindrical shape. A physical stopper (not shown) is formed on the outer peripheral surface of the third cylindrical portion 32 to regulate the phase. A driven-side internal gear portion 35 is formed on the inner peripheral surface of the third cylindrical portion 32. The driven-side internal gear portion 35 functions as a part of the reduction mechanism 70 as described later, and has plural driven-side internal teeth 35t formed to face inward in the radial direction. A fastening member insertion port 36 is formed at substantially the center of the third bottom portion 33. The center bolt 63 shown in FIG. 1 is inserted into the fastening member insertion port 36 to fasten the driven rotating body 30 and the camshaft 220 with each other. As a result, the driven rotating body 30 rotates in conjunction with the camshaft 220.

As shown in FIGS. 3 and 4, the third bottom portion 33 of the driven rotating body 30 has a supply hole 37 connected to the fastening member insertion port 36 and penetrating in the axial direction. The supply hole 37 is a through hole for supplying the lubricating oil through the camshaft 220 into the reduction mechanism 70. An annular oil passage 38 and an annular wall portion 39 are formed in the outer surface 31 of the third bottom portion 33, which is to be fastened to the camshaft 220. The annular oil passage 38 is recessed and extended along the circumferential direction. The annular oil passage 38 circulates the lubricating oil supplied through the camshaft 220 in the circumferential direction and guides the lubricating oil to the supply hole 37. The annular wall portion 39 is formed in an annular shape surrounding the annular oil passage 38, and protrudes toward the camshaft 220. The filter member 80 shown in FIGS. 1 and 2 is arranged on the inner peripheral side of the annular wall portion 39. A detailed description of the filter member 80 and the lubricating oil supply system 300 will be described later.

As shown in FIGS. 1 and 2, the reduction mechanism 70 of the present embodiment is configured by a so-called 2K-H type planetary gear mechanism. The reduction mechanism 70 includes an input rotating body 40, a planetary rotating body 50, a driving-side internal gear portion 24 formed in the second housing 21 of the driving rotating body 10, and a driven-side internal gear portion 35 formed in the driven rotating body 30. The axes of the driving-side internal gear portion 24 and the driven-side internal gear portion 35 coincide with the rotation axis AX1. The reduction mechanism 70 reduces the rotation speed of the input rotating body 40 and transmits it to the driven rotating body 30, so as to change the relative rotation phase of the driving rotating body 10 and the driven rotating body 30.

The input rotating body 40 has a substantially cylindrical shape and functions as a carrier of the planetary rotating body 50. A shaft (not shown) is inserted and fixed inside the input rotating body 40 and is connected to the rotation shaft of an electric actuator (not shown). The input rotating body 40 rotates integrally with the shaft by the driving force of the electric actuator. The axis of the rotation shaft of the electric actuator coincides with the rotation axis AX1 of the camshaft 220. The outer peripheral surface of the input rotating body 40 has a wall portion 41 projecting outward in the radial direction, at a substantially central portion in the axial direction. The outer peripheral surface of the input rotating body 40 has the first bearing 45 arranged on one side of the wall portion 41 in the axial direction and the second bearing 55 arranged on the other side of the wall portion 41 in the axial direction. The input rotating body 40 is rotatably supported by the second housing 21 via the first bearing 45. Therefore, the input rotating body 40 is configured to be integrally rotatable with the shaft and to be relatively rotatable with respect to the driving rotating body 10.

As shown in FIG. 1, the input rotating body 40 has an eccentric portion 42 that is eccentric with respect to the rotation axis AX1. The eccentric portion 42 is formed by a thick wall. Specifically, the eccentric portion 42 is formed by biasing the thickness in the circumferential direction. Two recesses 43 are formed on the other side of the outer peripheral surface of the input rotating body 40, and are open outward in the radial direction. The recesses 43 are provided so as to be biased toward the eccentric portion 42 in the circumferential direction. An urging member 44 is housed in each of the recesses 43. The urging member 44 urges the second bearing 55 radially outward at the eccentric portion 42 by the restoring force. Therefore, the input rotating body 40 supports the second bearing 55 with the eccentric axis AX2 as the central axis. A snap ring 64 is arranged on the end face of the urging member 44. The snap ring 64 restricts each of the urging members 44 from coming out of the recess 43 in the axial direction.

The planetary rotating body 50 includes the second bearing 55 and the planetary gear 51. The second bearing 55 is arranged on the inner peripheral surface of the planetary gear 51, and is supported by the input rotating body 40 via the two urging members 44, so that the restoring force received from each of the urging members 44 is transmitted to the planetary gear 51.

The planetary gear 51 is formed in a stepped cylindrical shape, and rotates about the eccentric axis AX2 via the second bearing 55. The planetary gear 51 has a driving-side external gear portion 52 and a driven-side external gear portion 54. The pitch circle diameter of the driving-side external gear portion 52 is larger than the pitch circle diameter of the driven-side external gear portion 54.

The driving-side external gear portion 52 has driving-side external teeth 52t formed to face outward in the radial direction. The driving-side external teeth 52t mesh with the driving-side internal teeth 24t formed on the driving-side internal gear portion 24. The driven-side external gear portion 54 has driven-side external teeth 54t formed to face outward in the radial direction. The driven-side external teeth 54t mesh with the driven-side internal teeth 35t formed in the driven-side internal gear portion 35. The number of the driving-side external teeth 52t and the driven-side external teeth 54t is smaller than the number of the driving-side internal teeth 24t and the driven-side internal teeth 35t, respectively, by the same number.

When the input rotating body 40 rotates about the rotation axis AX1 as the central axis, the planetary rotating body 50 revolves around the rotation axis AX1 while rotating around the eccentric axis AX2 as the central axis. The rotation speed of the planetary rotating body 50 is reduced with respect to the rotation speed of the input rotating body 40. The driven-side internal gear portion 35 and the driven-side external gear portion 54 function as transmission means for transmitting the rotation of the planetary rotating body 50 to the driven rotating body 30.

The reduction mechanism 70 having the above configuration decelerates the rotation of the input rotating body 40 driven by the electric actuator, thereby realizing the valve timing according to the relative phase between the driving rotating body 10 and the driven rotating body 30. Specifically, when the rotation speed of the input rotating body 40 and the rotating speed of the driving rotating body 10 are the same, the input rotating body 40 does not rotate relative to the driving-side internal gear portion 24 formed on the driving rotating body 10. Therefore, the planetary rotating body 50 does not move as a planet and rotates with the driving rotating body 10 and the driven rotating body 30. As a result, the relative phase does not change and the valve timing is maintained.

When the rotation speed of the input rotating body 40 is faster than the rotating speed of the driving rotating body 10, the input rotating body 40 rotates toward the advance side relative to the driving-side internal gear portion 24, and the planetary rotating body 50 makes a planetary motion. As a result, the driven rotating body 30 rotates relative to the driving rotating body 10 toward the advance side, and the valve timing advances. When the rotation speed of the input rotating body 40 is slower than the rotation speed of the driving rotating body 10, or when the rotation direction of the input rotating body 40 is opposite to the rotation direction of the driving rotating body 10, the input rotating body 40 rotates relative to the driving-side internal gear portion 24 toward the retard side, and the planetary rotating body 50 makes a planetary motion. As a result, the driven rotating body 30 rotates relative to the driving rotating body 10 toward the retard side, and the valve timing is retarded.

As shown in FIG. 1, the lubricating oil supply system 300 supplies the lubricating oil into the reduction mechanism 70. The lubricating oil supply system 300 includes an oil pump 310 and a lubricating oil supply path 320. The oil pump 310 sends lubricating oil as a lubricating fluid to the lubricating oil supply path 320. The lubricating oil supply path 320 is formed inside the camshaft 220 to extend in the axial direction, and supplies the lubricating oil into the reduction mechanism 70 of the valve timing adjustment device 100. The lubricating oil reduces the mechanical friction of the reduction mechanism 70. The lubricating oil of this embodiment is an engine oil, but the other lubricating fluid such as grease may be used.

Figure 5:
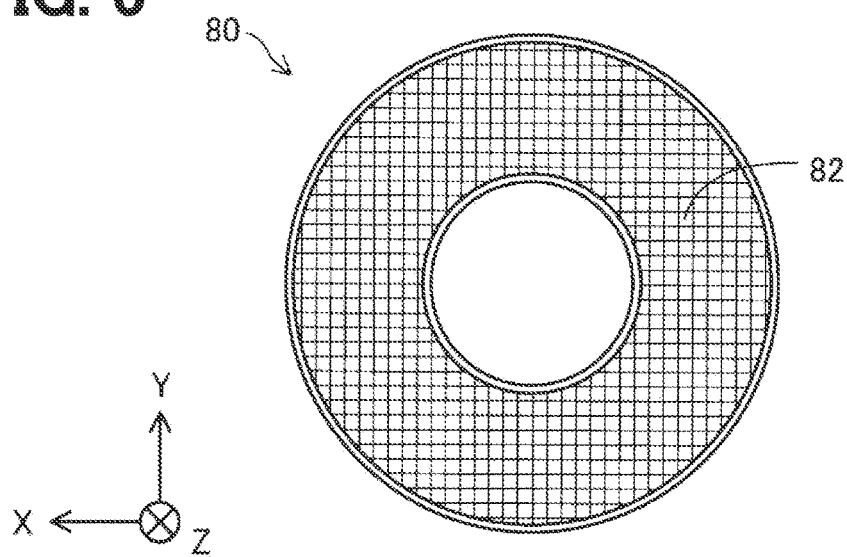
FIG. 5 is a front view illustrating a filter member of the valve timing adjustment device.

As shown in FIG. 5, the filter member 80 has a thin plate shape formed in an annular shape, in other words, a washer-like appearance shape. The filter member 80 has a filter unit 82. The filter unit 82 is configured to be able to capture a foreign matter contained in the lubricating oil supplied into the reduction mechanism 70. Examples of such foreign matter include abrasion powder and the like. In the present embodiment, the filter unit 82 is made of a metal mesh. Therefore, the filter unit 82 is formed to have plural fine holes arranged in a mesh pattern. The size of the mesh may be set according to the size of the foreign matter to be captured, the size of the driving-side internal teeth 24*t*, the driving-side external teeth 52*t*, the driven-side internal teeth 35*t*, the driven-side external teeth 54*t*, and the like.

Figure 6:
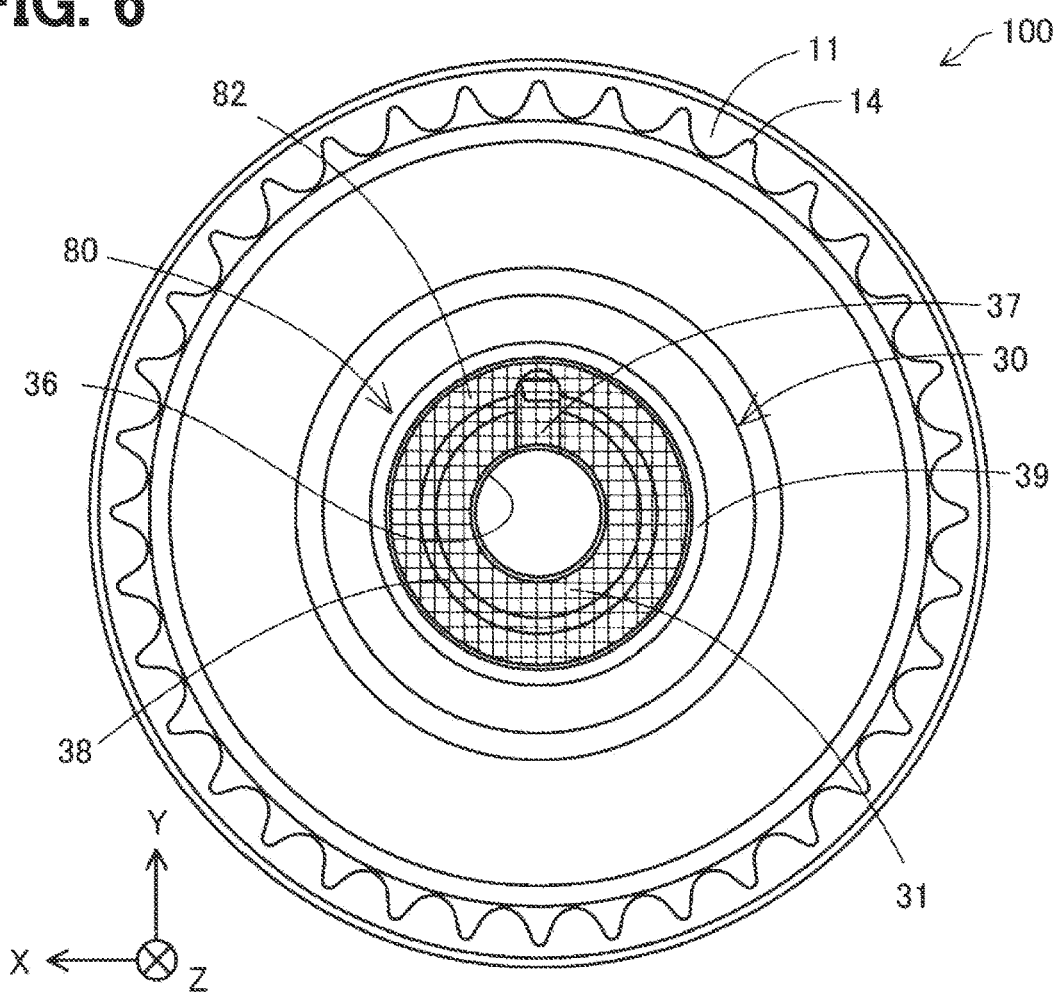
FIG. 6 is a front view illustrating the filter member arranged on an inner peripheral side of an annular wall portion.
Figure 7:
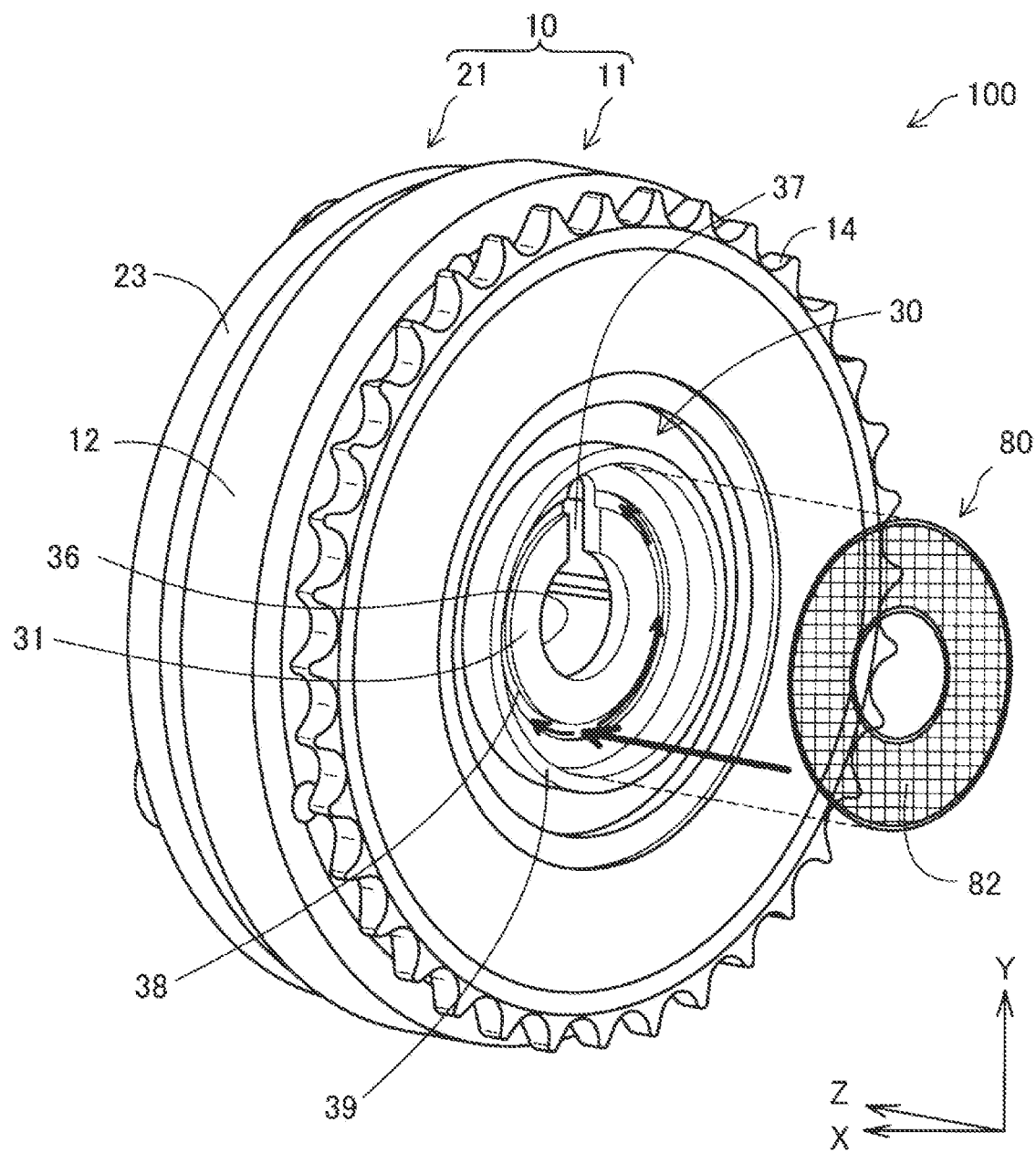
FIG. 7 is an explanatory diagram for explaining a flow of lubricating oil.

As shown in FIGS. 6 and 7, the filter member 80 is arranged in contact with the outer surface 31 of the driven rotating body 30. More specifically, the filter member 80 is arranged on the inner peripheral side of the annular wall portion 39. In FIG. 7, for convenience of illustration, the filter member 80 is separated from the driven rotating body 30. The filter unit 82 is arranged upstream of the supply hole 37 in the flow path, for the lubricating oil, connected to the supply hole 37. As shown in FIG. 1, the filter member 80 of the present embodiment is arranged between the driven rotating body 30 and the camshaft 220 to increase the friction coefficient. In other words, the filter unit 82 is provided on the friction shim that increases the coefficient of friction.

Figure 8:
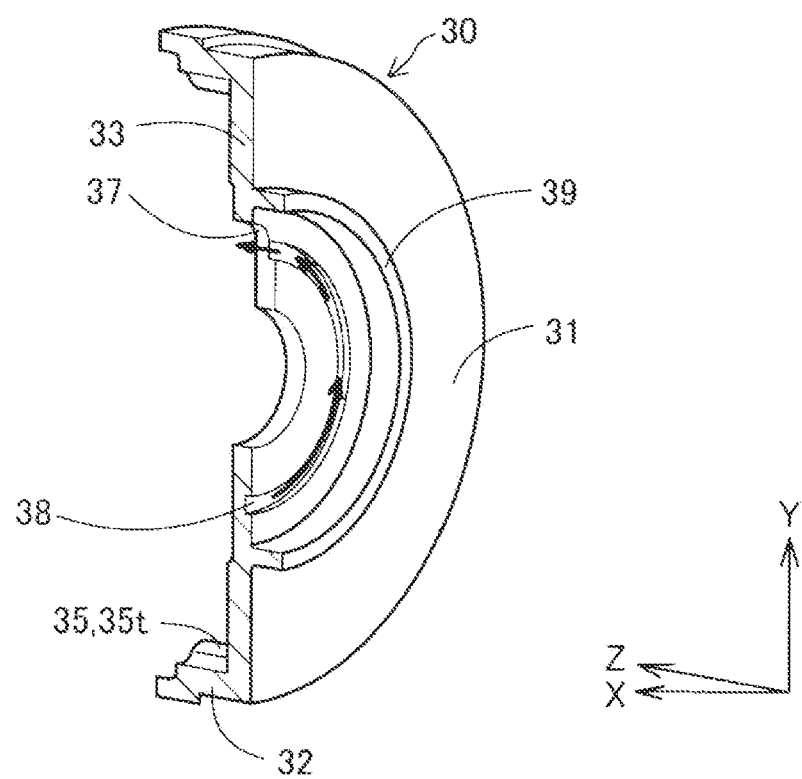
FIG. 8 is a perspective and cross-sectional view illustrating a driven rotating body for explaining a flow of lubricating oil.

In FIGS. 7 and 8, the flow of the lubricating oil is indicated by a thick arrow. The lubricating oil supplied from the lubricating oil supply path 320 formed on the camshaft 220 passes through the mesh of the filter unit 82, in other words, through the holes penetrating the filter unit 82 in the axial direction. Then, the lubricating oil flows into the annular oil passage 38 formed on the outer surface 31 of the driven rotating body 30. Therefore, the foreign matter contained in the lubricating oil cannot pass through the mesh of the filter unit 82 and is trapped. Thus, the inflow of the foreign matter into the annular oil passage 38 is suppressed. The lubricating oil that has passed through the mesh of the filter unit 82 and has flowed into the annular oil passage 38 flows into the reduction mechanism 70 through the supply hole 37.

In the present embodiment, the driving-side internal teeth 24*t* and the driven-side internal teeth 35*t* correspond to a subordinate concept of the internal teeth in the present disclosure. The driving-side internal gear portion 24 and the driven-side internal gear portion 35 correspond to a subordinate concept of the internal gear portion in the present disclosure. Further, the driving-side external teeth 52*t* and the driven-side external teeth 54*t* correspond to a subordinate concept of the external teeth in the present disclosure. The driving-side external gear portion 52 and the driven-side external gear portion 54 correspond to a subordinate concept of the external gear portion in the present disclosure.

According to the valve timing adjustment device 100 of the first embodiment, the filter unit 82 made of the mesh is arranged in the flow path connected to the supply hole 37 so as to capture a foreign matter contained in the lubricating oil supplied into the reduction mechanism 70. Therefore, a foreign matter contained in the lubricating oil can be restricted from entering the gear meshing portion between the driving-side internal gear portion 24 and the driving-side external gear portion 52, and the gear meshing portion between the driven-side internal gear portion 35 and the driven-side external gear portion 54. Therefore, it is possible to restrict the driving-side internal teeth 24*t*, the driving-side external teeth 52*t*, the driven-side internal teeth 35*t*, and the driven-side external teeth 54*t* from being worn by the foreign matter. Further, the rotation of the driving-side internal gear portion 24 and the driving-side external gear portion 52 and the rotation of the driven-side internal gear portion 35 and the driven-side external gear portion 54 can be restricted from stopping by the foreign matter. In other words, so-called gear lock can be suppressed. Therefore, it is possible to restrict the valve timing adjustment device 100 from stopping due to the foreign matter.

Since the filter unit 82 is arranged in the flow path for the lubricating oil, a foreign matter contained in the lubricating oil is captured even under conditions where the centrifugal force is small, for example, due to low temperature or low speed rotation. Further, since the filter unit 82 is made of mesh, a relatively small foreign matter can be captured. Therefore, a foreign matter can be suppressed from entering the gear meshing portion even in a configuration in which the driving-side internal teeth 24*t*, the driving-side external teeth 52*t*, the driven-side internal teeth 35*t*, and the driven-side external teeth 54*t* of the reduction mechanism 70 are relatively small in size.

Since the filter member 80 is composed of a washer-shaped member and is arranged on the end surface of the driven rotating body 30, a foreign matter can be captured with a simple structure. Since the filter unit 82 is arranged upstream of the supply hole 37 in the flow path connected to the supply hole 37, in other words, on the outer surface 31 of the driven rotating body 30, a foreign matter contained in the lubricating oil can be captured on the upstream side. Further, since the filter member 80 as the friction shim is provided with the filter unit 82, the function of increasing the friction coefficient and the function of capturing foreign matter can be obtained by a single member. Thus, increase in the number of components can be suppressed.

Second Embodiment

Figure 9:
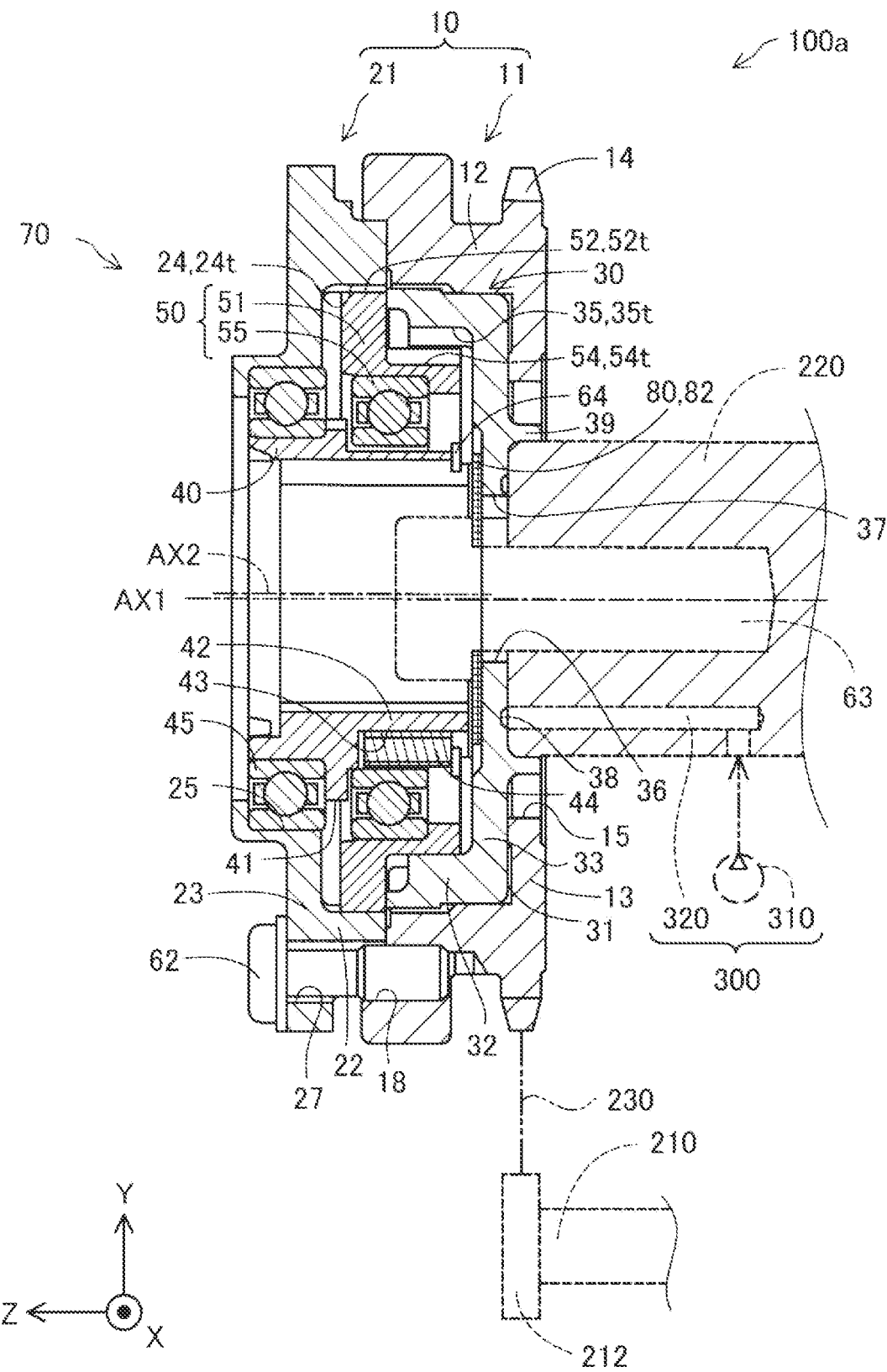
FIG. 9 is a cross-sectional view illustrating a schematic configuration of a valve timing adjustment device according to a second embodiment.
Figure 10:
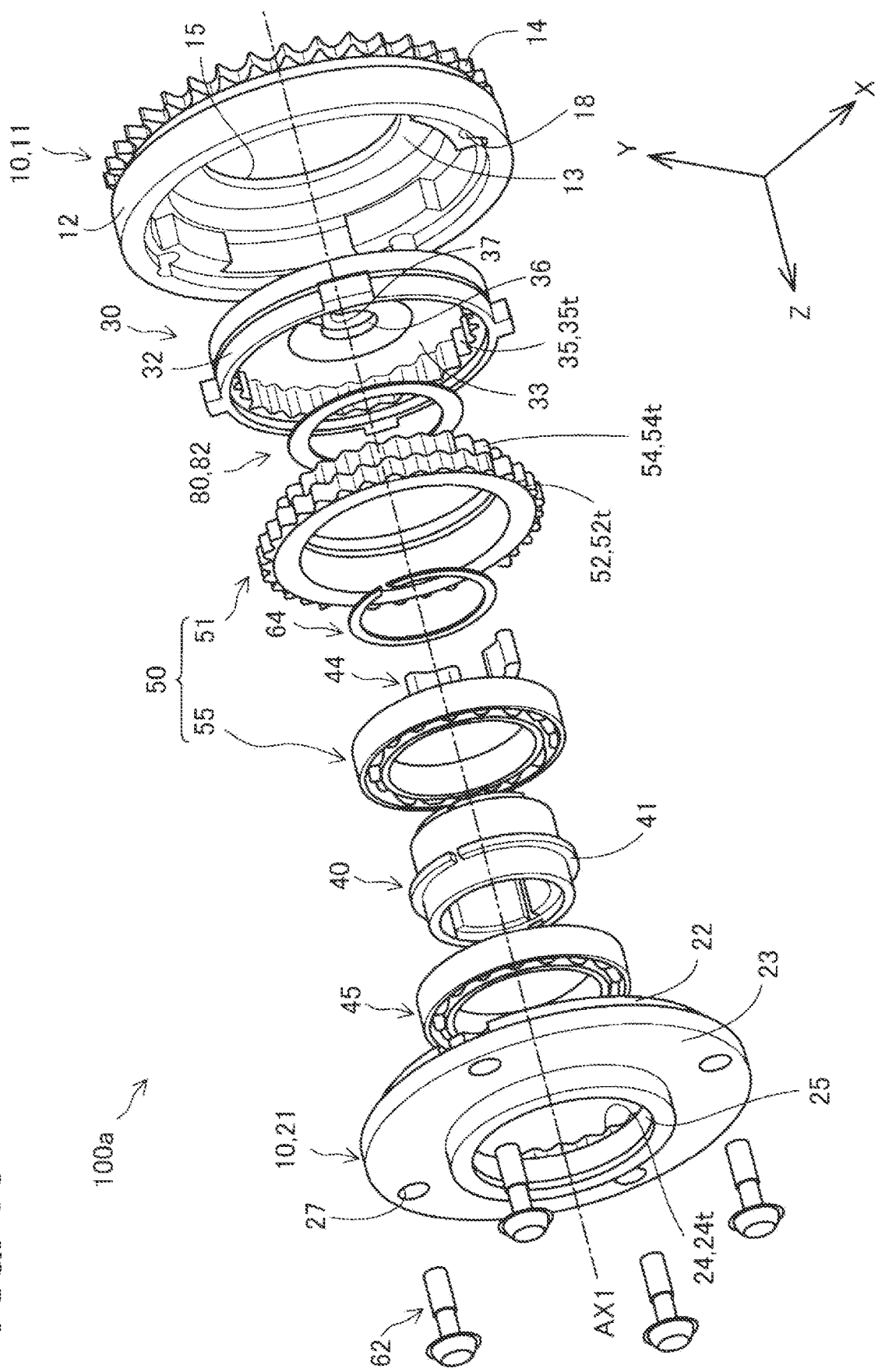
FIG. 10 is an exploded perspective view illustrating the valve timing adjustment device of the second embodiment.

The valve timing adjustment device 100*a* of the second embodiment shown in FIGS. 9 and 10 is different from the valve timing adjustment device 100 of the first embodiment in the arrangement position of the filter member 80. Since the other configurations are the same as those in the first embodiment, the same configurations are designated by the same reference numerals, and detailed description thereof will be omitted.

The filter member 80 included in the valve timing adjustment device 100*a* of the second embodiment is arranged in contact with a surface of the third bottom portion 33 of the driven rotating body 30 that is opposite to the outer surface 31. Therefore, the filter unit 82 is arranged to face the supply hole 37 in the axial direction, and is arranged downstream of the supply hole 37 in the flow path connected to the supply hole 37.

The filter member 80 of the second embodiment also functions as a spacer for adjusting a gap inside the reduction mechanism 70 in the axial direction. In other words, the filter unit 82 is provided on the spacer.

According to the valve timing adjustment device 100*a* of the second embodiment, effects can be obtained similarly to those of the valve timing adjustment device 100 according to the first embodiment. In addition, since the filter unit 82 is provided on the filter member 80 as a spacer for adjusting the internal gap of the reduction mechanism 70 in the axial direction, the function of the spacer and the function of capturing foreign matter can be obtained by a single member. The increase in the number of components can be suppressed.

Figure 11:
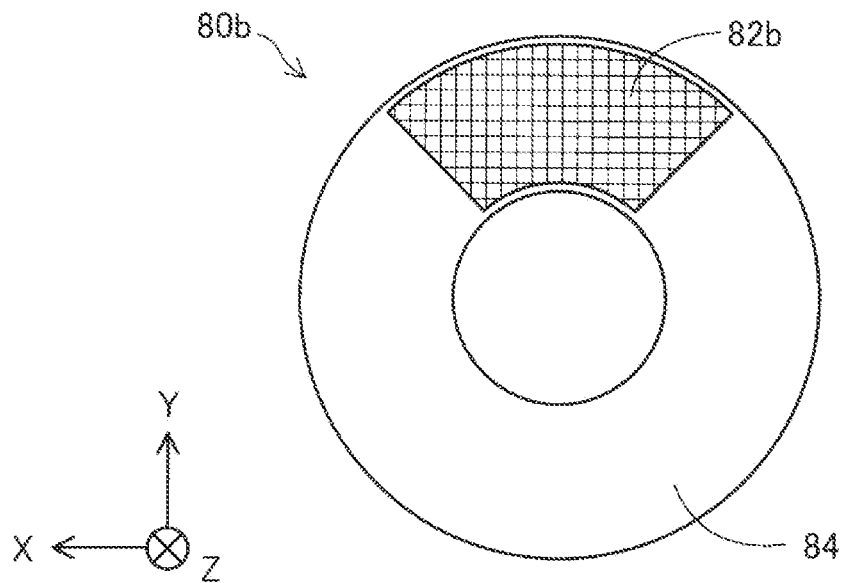
FIG. 11 is a front view illustrating a filter member according to a first modification.

Other Embodiments (1) As shown in FIG. 11, a filter member 80*b* according to a first modification is formed in an annular shape, as in each of the embodiments, and has the filter unit 82*b* and the washer portion 84. The filter unit 82*b* forms a part of the filter member 80b in the circumferential direction. The filter unit 82b has a sector-shape in the plan view, and is formed of metal mesh. The washer portion 84 constitutes a portion of the filter member 80b other than the filter unit 82b. The washer portion 84 has no holes as is formed in the filter unit 82b. The position of the filter member 80b is fixed in the circumferential position so that the filter unit 82b is located in the flow path, so as to capture a foreign matter contained in the lubricating oil.

For example, when the filter member 80b is applied to the valve timing adjustment device 100 of the first embodiment, the position of the filter member 80b may be fixed in the circumferential direction such that the filter unit 82b is located at a position facing the end of the lubricating oil supply path 320 adjacent to the driven rotating body 30. For example, when the filter member 80b is applied to the valve timing adjustment device 100a of the second embodiment, the position of the filter member 80b may be fixed in the circumferential direction such that the filter unit 82b is positioned to face the supply hole 37 of the driven rotating body 30. That is, in general, the filter unit 82, 82b may be arranged in the flow path connected to the supply hole 37. Even with such a configuration, the same effect as that of each of the embodiments can be obtained. In addition, since the filter member 80b has the washer portion 84, it is possible to suppress decrease in the strength of the filter member 80b.

Figure 12:
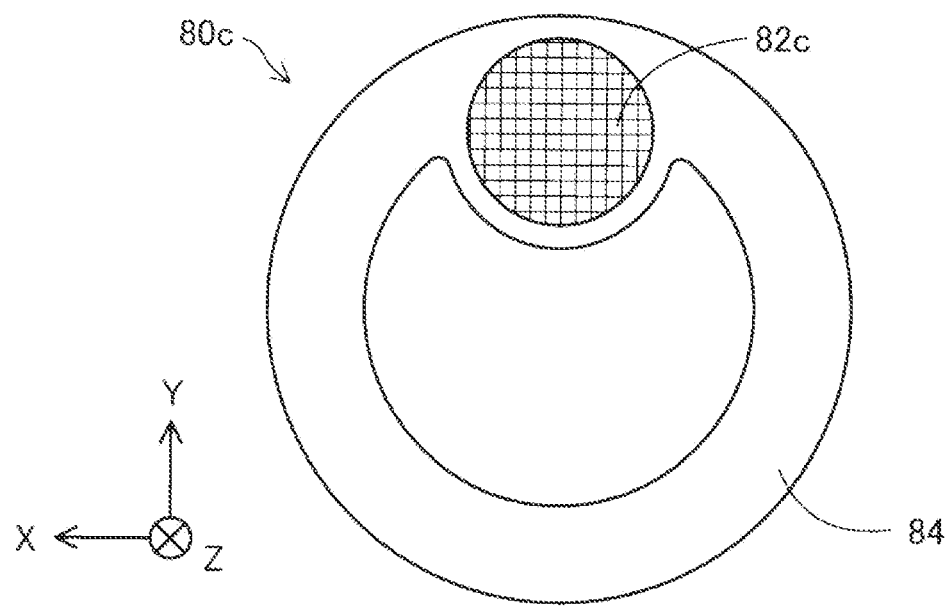
FIG. 12 is a front view illustrating a filter member according to a second modification.

(2) As shown in FIG. 12, the filter member 80c of the second modification is different from the filter member 80b in the appearance shape of the filter unit 82c. The filter unit 82c has a substantially circular shape in the plan view. As described above, the filter unit 82c may be any shape in the plan-view. For example, the filter unit 82c may be shaped according to the cross-sectional shape of the flow path for the lubricating fluid. Even with such a configuration, the same effect as that of each of the embodiments can be obtained.

(3) The configurations of the filter units 82, 82b, and 82c are merely examples and can be changed in various ways. For example, the filter unit 82, 82b, 82c is not limited to be made of mesh metal, and may be made of punching metal or the like. Further, the filter unit 82, 82b, 82c may be formed of a resin material, instead of the metal material. Further, the filter unit 82, 82b, 82c may be made by stacking plural thin plate-shaped filter members 80, 80b, 80c formed in an annular shape. In this case, since the thickness in the axial direction can be easily adjusted, the function as a spacer can be improved when applied to the valve timing adjustment device 100a of the second embodiment. Further, when the filter member 80b or the filter member 80c are applied, some of the filter units 82, 82c may be omitted in the filter member 80b, 80c. Even with such a configuration, the same effect as that of each of the embodiments can be obtained.

(4) The filter member 80 of the first embodiment functions as a spacer, and the filter member of the second embodiment functions as a friction shim, but the present disclosure is not limited thereto. The valve timing adjustment device 100, 100a may include other spacers and friction shims in addition to the filter member 80. Even with such a configuration, the same effect as that of each of the embodiments can be obtained.

(5) The configuration of the driven rotating body 30 is merely an example and can be variously changed. For example, the supply hole 37 of the driven rotating body 30 is formed to be connected to the fastening member insertion port 36, but may be formed separately from the fastening member insertion port 36. Even with such a configuration, the same effect as that of each of the embodiments can be obtained.

(6) In each of the embodiments, the reduction mechanism 70 is composed of a so-called 2K-H type planetary gear mechanism, but is not limited to. The reduction mechanism 70 may be so-called K-H-V type or 3K type planetary gear mechanism. The reduction mechanism 70 may be configured by a wave gear mechanism including a wave gear, instead of the planetary gear mechanism. Even with such a configuration, the same effect as that of each of the embodiments can be obtained.

(7) In each of the embodiments, the valve timing adjustment device 100, 100a adjusts the valve timing of the intake valve driven to open or close by the camshaft 220, but may adjust the valve timing of an exhaust valve driven to open or close by the camshaft 220. Further, in each of the embodiments, the reduction mechanism 70 changes the relative rotation phase between the driving rotating body 10 and the driven rotating body 30 by the driving force of the electric actuator, but the reduction mechanism 70 may change the relative rotation phase by the driving force of any actuator other than the electric actuator.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A valve timing adjustment device configured to adjust valve timing of a valve that is driven to open or close by a camshaft to which an engine torque is transmitted from a crankshaft in an internal combustion engine, the valve timing adjustment device comprising:
   a driving rotating body that rotates in conjunction with the crankshaft;
   a driven rotating body that rotates in conjunction with the camshaft;
   a reduction mechanism configured to change a relative rotation phase of the driving rotating body and the driven rotating body by a driving force of an actuator, the reduction mechanism including
   an internal gear portion having internal teeth formed inward in a radial direction, and
      an external gear portion having external teeth formed outward in the radial direction to mesh with the internal teeth; and
   a filter unit capable of capturing a foreign matter contained in lubricating fluid supplied into the reduction mechanism, wherein
   the driven rotating body has a supply hole penetrating in an axial direction to supply the lubricating fluid into the reduction mechanism through the camshaft,
   the filter unit has a plurality of holes penetrating in the axial direction, and the plurality of holes are arranged in a flow path for the lubricating fluid connected to the supply hole,
   the filter unit is provided on a spacer configured to adjust a gap inside the reduction mechanism in the axial direction; and the filter unit directly contacts the reduction mechanism and the driven rotating body.

2. The valve timing adjustment device according to claim 1, wherein:
an annular passage defined in the driven rotating body and extending in a circumferential direction of the driven rotating body is fluidly connected to the supply hole of the driven rotating body.

3. A valve timing adjustment device configured to adjust valve timing of a valve that is driven to open or close by a camshaft to which an engine torque is transmitted from a crankshaft in an internal combustion engine, the valve timing adjustment device comprising:
a driving rotating body that rotates in con junction with the crankshaft;
a driven rotating body that rotates in conjunction with the camshaft;
a reduction mechanism configured to change a relative rotation phase of the driving rotating body and the driven rotating body by a driving force of an actuator, the reduction mechanism including
an internal gear portion having internal teeth formed inward in a radial direction, and
an external gear portion having external teeth formed outward in the radial direction to mesh with the internal teeth; and
a filter unit capable of capturing a foreign matter contained in lubricating fluid supplied into the reduction mechanism, wherein
the driven rotating body has a supply hole penetrating in an axial direction to supply the lubricating fluid into the reduction mechanism through the camshaft,
the filter unit has a plurality of holes penetrating in the axial direction, and the plurality of holes are arranged in a flow path for the lubricating fluid connected to the supply hole, and
the filter unit is arranged upstream of the supply hole in the flow path for the lubricating fluid.

4. The valve timing adjustment device according to claim 3, wherein
an annular passage defined in the driven rotating body and extending in a circumferential direction of the driven rotating body is fluidly connected to the supply hole of the driven rotating body.

5. The valve timing adjustment device according to claim 3, wherein
the filter unit is arranged between the driven rotating body and the camshaft to increase a friction coefficient.

6. The valve timing adjustment device according to claim 5, wherein
the filter unit directly contacts the driven rotating body on one side of the filter unit in the axial direction; and
the filter unit directly contacts the camshaft on an opposite side of the filter unit in the axial direction.

7. A valve timing adjustment device configured to adjust valve timing of a valve that is driven to open or close by a camshaft to which an engine torque is transmitted from a crankshaft in an internal combustion engine, the valve timing adjustment device comprising:
a driving rotating body that rotates in conjunction with the crankshaft;
a driven rotating body that rotates in conjunction with the camshaft;
a reduction mechanism configured to change a relative rotation phase of the driving rotating body and the driven rotating body by a driving force of an actuator, the reduction mechanism including
an internal gear portion having internal teeth formed inward in a radial direction, and
an external gear portion having external teeth formed outward in the radial direction to mesh with the internal teeth; and
a filter unit capable of capturing a foreign matter contained in lubricating fluid supplied into the reduction mechanism, wherein
the driven rotating body has a supply hole penetrating in an axial direction to supply the lubricating fluid into the reduction mechanism through the camshaft,
the filter unit has a plurality of holes penetrating in the axial direction, and the plurality of holes are arranged in a flow path for the lubricating fluid connected to the supply hole, and
the filter unit is arranged between the driven rotating body and the camshaft to increase a friction coefficient, and the filter unit directly contacts the driven rotating body on one side of the filter unit in the axial direction and the filter unit directly contacts the camshaft on an opposite side of the filter unit in the axial direction.

8. The valve timing adjustment device according to claim 7, wherein
an annular passage defined in the driven rotating body and extending in a circumferential direction of the driven rotating body is fluidly connected to the supply hole of the driven rotating body.

\* \* \* \* \*